UNITED STATES PATENT OFFICE.

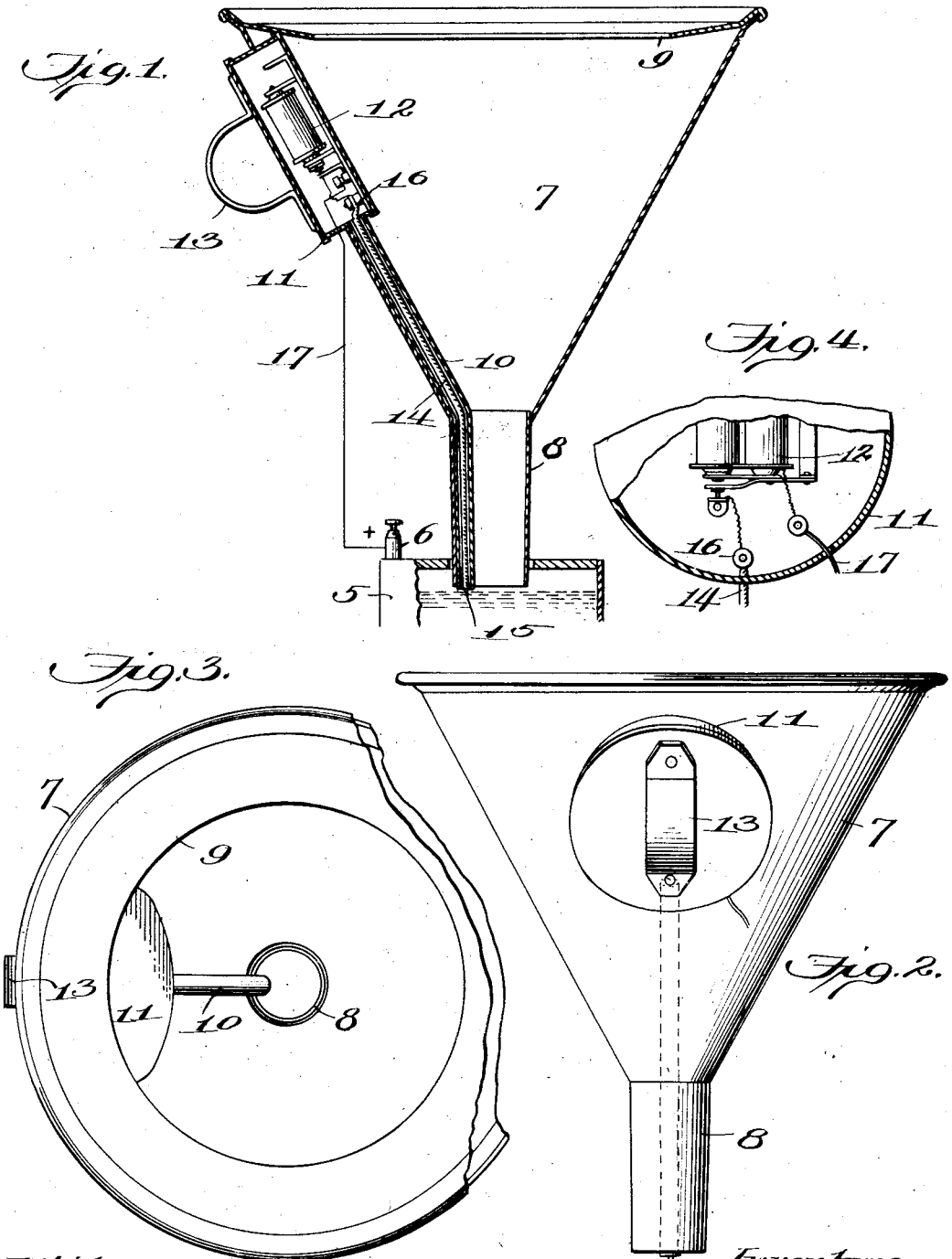

CHARLES O. KEAGY, BARTON K. TOLLINGER, AND WALTER H. BEATTY, OF PHILADELPHIA, PENNSYLVANIA.

BATTERY-FILLING FUNNEL.

1,084,444.  Specification of Letters Patent.  Patented Jan. 13, 1914.

Application filed March 18, 1913. Serial No. 755,231.

*To all whom it may concern:*

Be it known that we, CHARLES O. KEAGY, BARTON K. TOLLINGER, and WALTER H. BEATTY, citizens of the United States, residing at Philadelphia, in the county of Philadelphia and State of Pennsylvania, have invented new and useful Improvements in Battery-Filling Funnels, of which the following is a specification.

This invention relates to a battery filling funnel adapted for use in filling electric batteries with electrolyte liquid, and the primary object of the same is to provide a simple and effective operating means in connection with a funnel that will instantly give information by means of a signal when the battery cell has received a sufficient quantity of the electrolyte liquid in accordance with a predetermined arrangement and thereby prevent overflow of the liquid and contact thereof with the metal or iron of the cell to avoid corrosion and also obviate destruction of the wood portion of the cell and overcome any tendency to creation of electrolysis in other cells that may be close to the one that is filled.

A further object of the invention is to provide a simple form of battery filling funnel that may be utilized for filling purposes in darkness or where there is very little light without liability of spilling the electrolyte liquid or splashing the same over the upper portion of the cell being filled and serving as means to materially reduce the number of operatives usually required under present methods in filling or replenishing battery cells with electrolyte liquid.

With these and other objects and advantages in view the invention consists in the construction and arrangement of the several parts which will be more fully hereinafter described and claimed.

In the drawing: Figure 1 is a sectional view through a funnel embodying the features of the invention and showing the same applied to a battery cell diagrammatically represented. Fig. 2 is a side elevation of the improved funnel. Fig. 3 is a bottom plan view partially broken away. Fig. 4 is a detail sectional view showing a part of the buzzer which constitutes the signaling means and a part of the connections therefor.

The numeral 5 designates a battery cell which may be of any construction adapted to receive an electrolyte liquid and having the usual binding posts, only one, 6, of which is shown and constituting the positive terminal or connecting means. The form of the battery cell is not essential, nor is it material as to the precise nature of the opening or inlet for the electrolyte fluid, and it will be understood that the improved battery filling funnel is not confined in its use to any particular form of cell.

The improved funnel embodies the usual inverted frusto-conical body 7 having a nozzle or cylindrical outlet extremity 8, and to prevent the overflow of the liquid from the funnel body at the top of the latter an annulus or guard 9 is secured thereto and overcomes any tendency to splashing or running over of the electrolyte liquid at the top of the funnel. Extending downwardly over a portion of the funnel body and throughout the length of the nozzle 8 is a conduit or tube attachment 10 which is open at its lower end and communicates at its upper end with the bottom of a casing or inclosure 11 in which the signal or alarm 12 is mounted and consists in this instance of the well known form of buzzer. It will be understood, however, that any other suitable signal device may be used, but a buzzer is preferred in view of its simplicity of application and operation. The casing 11 is set in the upper portion of the body of the funnel as shown by Fig. 1, but does not interfere with the function of the latter; and the outer side of the casing has a handle or grip 13 attached thereto for convenience in applying and removing the funnel as an entirety and also in transporting the said funnel from one place to another. Within the conduit or pipe 10 an insulated wire 14 is mounted and terminates coincidently with the bottom of the tube, the wire being slightly projected to provide a contact point 15, the said contact point being tipped with silver. The insulated wire 14 is preferably copper and connects with a binding post 16 in the lower portion of the casing 11 and carried by a part of the buzzer so as to establish electrical connection with the magnet or coils of the latter. The armature, when the funnel is in use, is connected by a wire 17 with the positive post or connection 6.

In the use of the improved battery filling funnel the nozzle 8 is inserted in the inlet opening of the cell any desired distance or in accordance with the height the electrolyte liquid is to assume in the cell, and the wire 17 is temporarily attached or connected up to the post 6. The liquid is then poured into the battery through the funnel and when the liquid reaches a height where it will come in contact with the silver tipped end or terminal 15 of the copper wire it forms a complete circuit and operates the buzzer 12. The operation of the buzzer informs the person filling the battery that the liquid is within the desired distance from the top of the cell and the supply of the liquid to the funnel will be stopped or the person filling the battery will cease to pour any more of the liquid into the funnel, and overflow at the top portion of the battery will be prevented.

The improved battery filling funnel is simple in its organization and may be readily constructed at a minimum expense by simply applying the conduit or tube 10 and inserting the casing 12 carrying the buzzer or signaling device in the body of the funnel, as shown in the drawing. The funnel is light and readily portable and the parts thereof will not become easily disarranged or injured and consequently the funnel as an entirety will be strong and durable.

It will be understood that the proportions of the parts of the funnel as well as the improved features may be modified and varied at will to accommodate cells of different sizes.

What is claimed is:

1. A battery filling funnel comprising a funnel shaped body having a nozzle with a tubular inclosure extending downwardly over a portion of the body and fully throughout the length of the nozzle, a casing carried by the funnel body and having an electrically operated signaling device therein, an electrical connection attached to the signaling device and extending exteriorly of the casing and adapted to be attached to one of the poles of a battery, and an insulated wire conductor extending through the tubular inclosure and connected to the signaling device the conductor being out of metallic contact with any part of the tubular inclosure and the nozzle and having a terminal exposed solely at its lower end below the lower end of the nozzle.

2. A battery filling funnel comprising a funnel shaped body having a nozzle, an inclosed insulated wire conductor extending full length of the nozzle and over a portion of the body of the funnel, the said insulated wire conductor being out of metallic contact with any part of the nozzle or body of the funnel and exposed solely at its lower end below the lower end of the nozzle, a casing mounted in the upper part of the body and having an electrical signaling device therein, the conductor being connected to the signaling device, and another electrical conductor connected to the signaling device and adapted to be attached to one of the poles of the battery in which the nozzle of the funnel is inserted.

3. A battery filling funnel comprising a frusto-conical body with a nozzle, an insulated wire conductor having one terminal projected below the end of the nozzle, the said conductor being out of metallic contact with any portion of the funnel body or nozzle and structurally independent of both of the latter, an electrical signaling device to which the conductor is attached, the electrical signaling device and the conductor being inclosed and carried with the funnel as a part of the organization thereof, and another electrical conductor attached to the signaling device and adapted to be connected to one of the poles of the battery into which the nozzle is inserted.

In testimony whereof we have hereunto set our hands in presence of two subscribing witnesses.

CHARLES O. KEAGY.
BARTON K. TOLLINGER.
WALTER H. BEATTY.

Witnesses:
A. A. STRECK,
LESTER G. STEVENS.